(12) United States Patent  (10) Patent No.: US 11,725,086 B2
Varadarajan et al.  (45) Date of Patent: Aug. 15, 2023

(54) SHRINK FILMS AND METHODS FOR MAKING THE SAME

(71) Applicant: Berry Global, Inc., Evansville, IN (US)

(72) Inventors: Krishnaraju Varadarajan, Evansville, IN (US); Daniel L. Merriman, Greenville, SC (US); Abboud L. Mamish, Marlborough, MA (US)

(73) Assignee: Berry Global, Inc., Evansville, IN (US)

( * ) Notice: Subject to any disclaimer, the term of this patent is extended or adjusted under 35 U.S.C. 154(b) by 643 days.

(21) Appl. No.: 16/291,445

(22) Filed: Mar. 4, 2019

(65) Prior Publication Data

US 2019/0270856 A1 Sep. 5, 2019

Related U.S. Application Data

(60) Provisional application No. 62/638,335, filed on Mar. 5, 2018.

(51) Int. Cl.
*C08J 5/18* (2006.01)
*C08L 23/06* (2006.01)
(Continued)

(52) U.S. Cl.
CPC ............. *C08J 5/18* (2013.01); *B29C 48/001* (2019.02); *B29C 48/022* (2019.02); *B29C 48/08* (2019.02); *B29C 48/912* (2019.02); *C08L 23/06* (2013.01); *B65D 71/08* (2013.01); *C08L 2203/16* (2013.01); *C08L 2203/162* (2013.01);
(Continued)

(58) Field of Classification Search
CPC . C08J 5/18; C08J 2423/06; C08J 7/123; C08J 2323/06; C08J 3/24; C08L 23/06; C08L 2205/025; C08L 2203/16; C08L 2203/162; C08L 2207/062; C08L 2207/066; B29C 48/022; B29C 48/001; B29C 48/912; B29C 48/08; B29C 48/0018; B29C 48/21; B29C 48/10; B29C 35/00; B29C 35/02; B29C 35/08; B29C 35/0805; B29C 35/0866; B29C 35/10; B65D 71/08;
(Continued)

(56) References Cited

U.S. PATENT DOCUMENTS 3,022,543 A * 2/1962 Baird, Jr. ................ B29C 61/06
425/DIG. 53
3,141,912 A * 7/1964 Goldman ................ B29C 48/03
264/564

(Continued)

FOREIGN PATENT DOCUMENTS

EP 0510213 B1 10/1992
EP 1279494 B1 1/2003
WO WO2017018479 * 2/2017

OTHER PUBLICATIONS

The Wiley Encyclopedia of Packaging Technology, pp. 233-238, 748-750, 753-754 (Aaron L. Brody et al. eds., 2nd Ed. 1997), 13 pages.

(Continued)

*Primary Examiner* — Jeffrey M Wollschlager
(74) *Attorney, Agent, or Firm* — Barnes & Thornburg LLP (57) ABSTRACT

A shrink film includes at least one layer of polyethylene. The layer has a thickness of about 1 mil to about 3 mil. Materials and methods for forming crosslinked shrink films via a blown film extrusion process are described.

10 Claims, 1 Drawing Sheet

(51) Int. Cl.
*B29C 48/00* (2019.01)
*B29C 48/88* (2019.01)
*B29C 48/08* (2019.01)
*B65D 71/08* (2006.01)

(52) U.S. Cl.
CPC ... *C08L 2205/025* (2013.01); *C08L 2207/062* (2013.01); *C08L 2207/066* (2013.01)

(58) Field of Classification Search
CPC ........ B65D 75/002; B65D 2571/00024; B65D 2571/00679
See application file for complete search history.

(56) References Cited

U.S. PATENT DOCUMENTS

| | | | |
|---|---|---|---|
| 3,340,122 A * | 9/1967 | Hofer | B29C 48/03 156/308.2 |
| 3,555,604 A * | 1/1971 | Pahlke | B29C 48/768 425/72.1 |
| 3,659,000 A * | 4/1972 | Cronk | B29C 55/28 156/244.14 |
| 3,663,662 A * | 5/1972 | Golike | C08L 23/04 522/112 |
| 4,277,594 A * | 7/1981 | Matthews | B29C 55/143 264/564 |
| 5,043,204 A | 8/1991 | Itaba | |
| 5,356,677 A * | 10/1994 | Meilhon | B32B 27/32 428/913 |
| 5,460,861 A * | 10/1995 | Vicik | B32B 27/32 428/34.9 |
| 5,554,668 A | 9/1996 | Scheve | |
| 5,562,958 A * | 10/1996 | Walton | C08L 23/04 428/354 |
| 5,591,785 A | 1/1997 | Scheve | |
| 5,632,843 A | 5/1997 | Lustig | |
| 5,731,362 A | 3/1998 | Scheve | |
| 6,060,533 A | 5/2000 | Bavaro | |
| 6,225,411 B1 | 5/2001 | Dang | |
| 6,265,055 B1 | 7/2001 | Simpson | |
| 6,306,970 B1 | 10/2001 | Dang | |
| 6,413,346 B1 * | 7/2002 | Planeta | B29C 65/028 156/244.27 |
| 6,602,956 B2 | 8/2003 | Zhao | |
| 6,646,056 B2 | 11/2003 | Zhao | |
| 6,699,919 B1 | 3/2004 | Charlier | |
| 6,774,156 B2 | 8/2004 | Debras | |
| 7,169,827 B2 | 1/2007 | Debras | |
| 7,439,306 B2 * | 10/2008 | Davis | C08L 23/06 525/240 |
| 7,470,727 B2 | 12/2008 | Iwashita | |
| 7,935,740 B2 | 5/2011 | Dang | |
| 8,389,632 B2 | 3/2013 | Lee | |
| 8,399,536 B2 | 3/2013 | Abata | |
| 10,619,020 B2 * | 4/2020 | Rosa | C08J 5/18 |
| 2003/0017285 A1 * | 1/2003 | Cantrell | B29C 53/42 428/35.1 |
| 2004/0033380 A1 | 2/2004 | Bobovitch | |
| 2004/0053022 A1 | 3/2004 | Ohlsson | |
| 2004/0053054 A1 | 3/2004 | Bobovitch | |
| 2004/0137206 A1 | 7/2004 | Pettis | |
| 2004/0166348 A1 * | 8/2004 | Taghavi | B29C 48/307 428/500 |
| 2005/0064218 A1 * | 3/2005 | Davis | C08L 23/06 428/218 |
| 2005/0214557 A1 * | 9/2005 | Arthurs | B32B 27/306 428/516 |
| 2006/0286321 A1 | 12/2006 | Broadus | |
| 2007/0237915 A1 | 10/2007 | Ishii | |
| 2008/0057313 A1 * | 3/2008 | Bicakci-Jenkins | C08L 23/10 428/413 |
| 2008/0292225 A1 * | 11/2008 | Dayrit | B32B 27/08 383/207 |
| 2011/0008603 A1 * | 1/2011 | Ellingson | C08L 23/0815 525/240 |
| 2012/0100356 A1 * | 4/2012 | Ohlsson | B32B 27/327 428/218 |
| 2017/0210103 A1 * | 7/2017 | Hausmann | B65B 53/02 |
| 2018/0215884 A1 * | 8/2018 | Takasugi | C08J 5/18 |
| 2020/0361193 A1 * | 11/2020 | Song | B32B 27/306 |
| 2021/0046743 A1 * | 2/2021 | Hirvi | B65B 53/02 |

OTHER PUBLICATIONS

Kirk-Othmer Concise Encyclopedia of Chemical Technology, pp. 1420-1421 (Jacqueline I. Kroschwitz et al. eds., 4th Ed. 1999), 4 pages.
International (PCT) Search Report and Written Opinion for PCT/US2019/020528 dated Jul. 9, 2019, BP-526 PCT ||, 14 pages.
Achilias et al. "Chemical recycling of plastics wastes made from polyethylene (LDPE and HDPE) and polypropylene (PP)" Journal of Hazardous Materials, vol. 149 Issue 3 (Nov. 19, 2007), pp. 536-542, entire document.

* cited by examiner

SHRINK FILMS AND METHODS FOR MAKING THE SAME

PRIORITY CLAIM

This application claims priority under 35 U.S.C. § 119(e) to U.S. Provisional Application No. 62/638,335, filed Mar. 5, 2018, which is expressly incorporated by reference herein.

BACKGROUND

The present disclosure relates to polymeric materials, and particularly to polymeric films. More particularly, the present disclosure relates to shrink films formed from polymeric material.

SUMMARY

According to the present disclosure, a shrink film includes at least one layer comprising polymeric materials. The polymeric materials may include polyethylene.

In illustrative embodiments, the shrink film is irradiated. The irradiation is at a dose of about 1.25 Mrad to about 10 Mrad, and the layer has a thickness of about 1 mil to about 3 mil.

In illustrative embodiments, a shrink film includes at least one layer comprising about 73% LDPE and about 27% HDPE. The layer has been irradiated at a dose of about 1.25 Mrad to about 10 Mrad, and the layer has a thickness of about 1 mil to about 3 mil.

In illustrative embodiments, a shrink film includes at least one layer comprising about 30% LDPE, about 39% HDPE, about 28% mPE, and about 3% antistat. The layer has been irradiated at a dose of about 1.25 Mrad to about 10 Mrad, and the layer has a thickness of about 1 mil to about 3 mil.

In illustrative embodiments, a process for making a shrink film is disclosed. An extrudable material is extruded through a die to form a molten tubular film. The extrudable material comprises polyethylene. The molten tubular film is injected with air to form a film bubble. The film bubble is drawn away from the die. The film bubble is slit on two edges and two rolls of shrink film are wound. Alternatively, the film bubbled may be collapsed upon itself, thereby forming a blocked shrink film. The shrink film is crosslinked.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying FIGURE in which.

DETAILED DESCRIPTION

Figure 1:
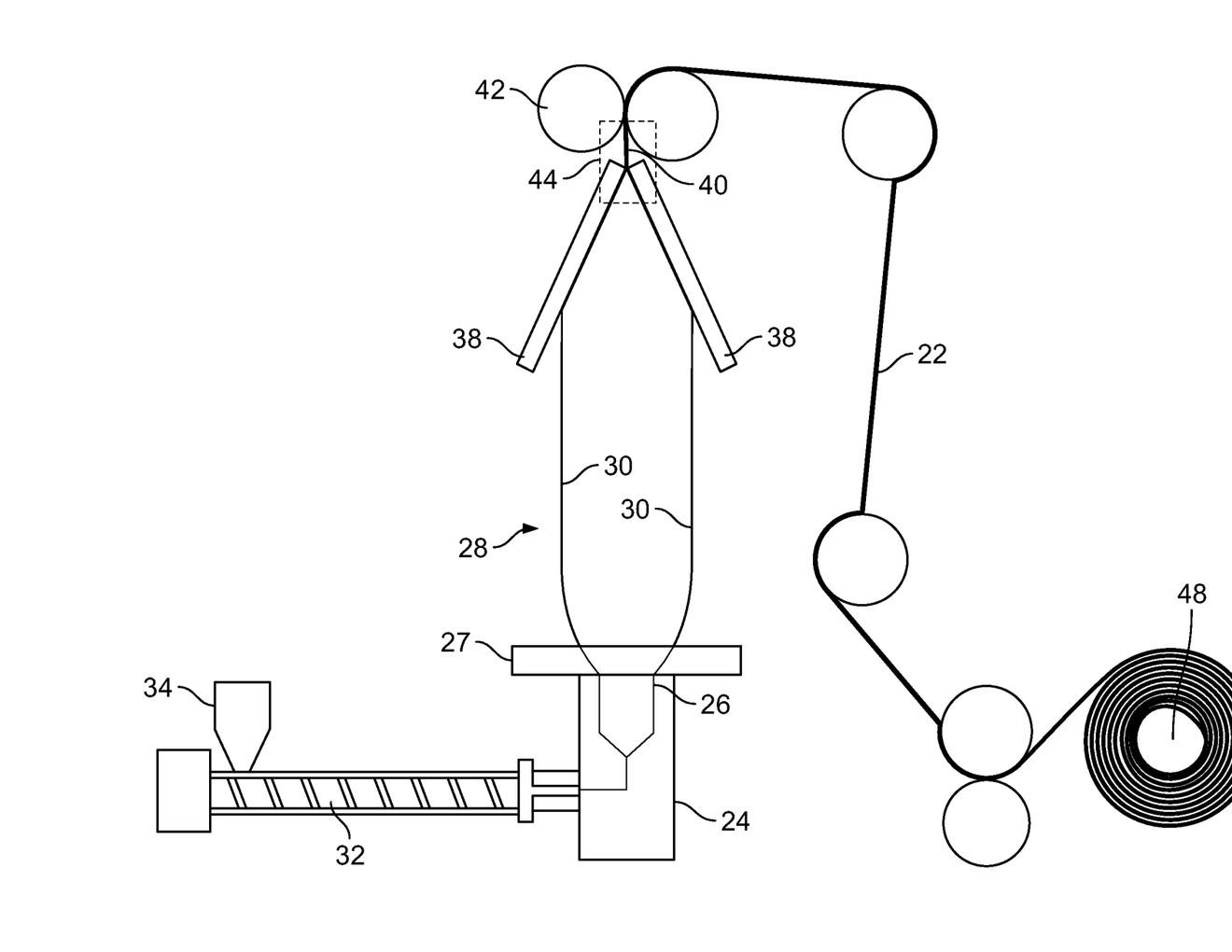
FIGURE is a diagrammatic view of an exemplary process for forming a shrink film via a blown film extrusion process.

In illustrative embodiments, the present disclosure provides shrink films that include at least one layer comprising a crosslinked polymer. As used herein, crosslinked polymer refers to a polymer where polymer chains are linked to other polymer chains, such as by covalent bonding. The shrink films described herein may be used for a variety of purposes. For example, the shrink films may be used for packaging and/or protecting goods.

The crosslinked shrink films of the present disclosure may have improved properties and performance compared to other shrink films having the same or similar thickness. Additionally, even at thinner gauges, the crosslinked shrink films described herein may achieve equivalent or improved performance compared to thicker shrink films. Thus, the crosslinked shrink films may use less material than conventional shrink films and offer better performance at the same or lower cost.

The shrink films in accordance with the present disclosure may be manufactured by various methods, including but not limited to cast film, blown film, or other extrusion or coextrusion methods. Such methods are generally known by those skilled in the art. Additionally, the shrink films described herein may comprise one or more layers. The methods described herein may be modified by those skilled in the art to adjust the number of layers, as desired. In some embodiments, the shrink film is a single layer. In some embodiments, the shrink film is a three layer coextruded film. In some embodiments, the shrink film has at least three layers and is coextruded.

Shrink films disclosed herein may be formed from extrudable materials by casting or extrusion processes. Methods for cast film, feed block and blown film extrusion are disclosed in The Wiley Encyclopedia of Packaging Technology, Aaron L. Brody et al. eds., 2nd Ed. 1997, pp. 233-38, the disclosure of which is incorporated herein by reference in its entirety. Methods for film extrusion are also disclosed in U.S. Pat. No. 6,265,055, which is also incorporated herein by reference in its entirety.

In illustrative embodiments, the shrink films of the present disclosure may be made by blown film (tubular) extrusion. In a blown film extrusion process in accordance with the present disclosure, a film bubble may be collapsed upon itself to form a lay-flat tube. As the bubble is formed, it is stretched and cooled to impart shrinking properties to the finished film, such that the finished film shrinks upon exposure to heat. The bubble is slit on two edges and two rolls are wound simultaneously from the slit film bubble. Alternatively the film bubble is collapsed, where upon collapse of the film bubble formed during the blown film extrusion process, interior surfaces of the film bubble are fused together. The process may use a higher draw down ratio to blow up ratio in order to increase shrink and other properties. Moreover, the amount of orientation in the film may be increased. The shrink film may be manufactured as mono-directional shrink film that shrinks in one direction or as bidirectional shrink film that shrinks in two directions.

In some embodiments, a process for making a shrink film in accordance with the present disclosure includes (a) extruding one or more extrudable materials through a die to form a molten tubular film, (b) injecting the molten tubular film with air to form a film bubble, (c) drawing the film bubble away from the die, and (d) optionally collapsing the film bubble upon itself, thereby forming the shrink film.

For example, a process for making the shrink film in accordance with the present disclosure may be executed as shown in simplified schematic form in the FIGURE The process includes feeding one or more extrudable materials to an extruder 32 via a hopper 34. The molten polymeric material is extruded through a die 24 to form a molten tubular film 26. Air is injected into an interior of the molten tubular film 26 through the die 24, which results in the formation of a film bubble 28. The interior surface and/or exterior surface of the film bubble 28 may be cooled using blown air from the air ring 27.

In illustrative embodiments, an interior surface 30 of the film bubble 28 is formed, as shown in the FIGURE. The film bubble 28 is drawn away from the die 24 in a machine direction or, in some embodiments, in a direction transverse to the machine direction. In some embodiments, the film bubble 28 is drawn away from the die 24 in both a machine direction and a direction transverse to the machine direction (the latter, in some embodiments, being a result of the expansion of film bubble 28). The drawing of the film bubble causes a reduction in the thickness of the walls of film bubble 28. In addition, the drawing of the film bubble imparts orientation and shrink forces to the material, which may be harnessed at a later date when heat is applied to the shrink film. The film bubble 28 continues its expansion until it comes in contact with a collapsing frame 38, at which point the film bubble 28 begins to collapse upon itself to from a lay-flat tubular film 40. In the lay-flat tubular film 40 formed when collapse first occurs, the opposing interior surfaces 30 of the film bubble 28 are brought into physical contact and begin to fuse together resulting in the formation of a shrink film 22. In some embodiments, the film bubble 28 is slit on two edges and two rolls of film 40 are wound simultaneously. Although not shown in the FIGURE, additional steps may optionally be taken to promote fusion of the collapsed film bubble 40 (e.g., by increasing a temperature and/or a pressure on a portion of the collapsed film bubble 40). In addition, although not shown in the FIGURE, one or more edges of the shrink film 22 may optionally be cut if desired. The shrink film 22 may then be passed through nip rollers 42 and wound onto a roller 48.

In illustrative embodiments, the extrudable materials are crosslinked to form a crosslinked shrink film. Crosslinking may be performed according to methods known in the art, such as by chemical reactions or by exposure to energy. Without intending to be bound by theory, crosslinking causes the polymer chains of the extrudable materials to be linked by the formation of covalent bonds.

In some embodiments, the extrudable materials used to make shrink film 22 may be crosslinked while shrink film 22 is being formed according to the FIGURE. Thus, the present embodiments contemplate in-line crosslinking such that shrink film 22 is a crosslinked shrink film. For example, electron-beam processing may be performed by irradiating the bubble 28. Alternatively or additionally, the shrink film 22 may be irradiated after exiting the collapsing frame 38 or after being slit.

The electron-beam processing methods described herein are configured to provide performance improvements to the film without irradiating excessively the film in a manner that hinders performance. Tension may be maintained during electron-beam irradiation so that the shrink film does not either shrink or stretch during this step, including due to the heat generated during irradiation. When crosslinking is accomplished by electron-beam irradiation, the film may be irradiated at a dose in a first set of ranges of about 1 Mrad to about 30 Mrad, about 1 Mrad to about 25 Mrad, about 1 Mrad to about 20 Mrad, about 1 Mrad to about 15 Mrad, about 1 Mrad to about 10 Mrad, about 1 Mrad to about 5 Mrad, or about 1 Mrad to about 2.5 Mrad. In a second set of ranges, the dose is about 2.5 Mrad to about 30 Mrad, about 2.5 Mrad to about 25 Mrad, about 2.5 Mrad to about 20 Mrad, about 2.5 Mrad to about 15 Mrad, about 2.5 Mrad to about 10 Mrad, or about 2.5 Mrad to about 5 Mrad. In a third set of ranges, the dose is about 5 Mrad to about 30 Mrad, about 5 Mrad to about 25 Mrad, about 5 Mrad to about 20 Mrad, about 5 Mrad to about 15 Mrad, about 5 Mrad to about 10 Mrad, about 5 Mrad to about 9 Mrad, about 5 Mrad to about 8 Mrad, about 5 Mrad to about 7 Mrad, or about 5 Mrad to about 6 Mrad. In a fourth set of ranges, the dose is about 6 Mrad to about 10 Mrad, about 6 Mrad to about 9 Mrad, about 6 Mrad to about 8 Mrad, about 6 Mrad to about 7 Mrad, about 7 Mrad to about 10 Mrad, about 7 Mrad to about 9 Mrad, about 7 Mrad to about 8 Mrad. In a fifth set of ranges, the dose is about 1.25 Mrad to about 30 Mrad, about 1.25 Mrad to about 25 Mrad, about 1.25 Mrad to about 20 Mrad, about 1.25 Mrad to about 15 Mrad, about 1.25 Mrad to about 10 Mrad, about 1.25 Mrad to about 5 Mrad, or about 1.25 Mrad to about 2.5 Mrad. In some embodiments, the dose is about 1 Mrad, about 1.25 Mrad, about 1.5 Mrad, about 1.75 Mrad, about 2 Mrad, about 3 Mrad, or about 4 Mrad. In some embodiments, the dose is about 5 Mrad, about 6 Mrad, about 7 Mrad, about 8 Mrad, about 9 Mrad, or about 10 Mrad.

The voltage used to produce the electron beam for electron-beam irradiation may be adjusted based on the thickness of the shrink film and/or the desired penetration depth of crosslinking. In some instances, a higher voltage may be desirable when irradiating a thicker film. Conversely, a lower voltage may be desirable when irradiating a thinner film. In illustrative embodiments, the voltage used to produce the electron beam may be about 10 KeV to about 1000 KeV, about 50 KeV to about 500 KeV, about 100 KeV to about 350 KeV, about 100 KeV to about 250 KeV, about 150 KeV to about 250 KeV, about 150 KeV to about 200 KeV, about 170 KeV to about 190 KeV, or about 175 KeV.

In illustrative embodiments, the shrink film comprises at least one layer. In some embodiments, the shrink film comprises one layer. In some embodiments, the shrink film consists of one layer. In some embodiments, the shrink film comprises at least two layers or at least three layers. In some embodiments, the shrink film comprises three layers. In some embodiments, the shrink film consists of three layers. Illustratively, the three layers may be arranged in an A/B/A arrangement so that the B layer is located between two A layers, wherein A and B denote the different compositions of the respective layers. In some embodiments, the A/B/A shrink film is formed prior to irradiation. In some embodiments, at least one layer of the A/B/A shrink film is irradiated prior to forming the shrink film.

In an illustrative embodiment, the irradiated layer may be the A layer or the B layer. In some embodiments, one or both of the A layers is irradiated. In some embodiments, the B layer is not irradiated. Illustratively, the irradiating process can be performed by exposing both sides of the A/B/A film to radiation so that the A layers are selectively irradiated. In some other illustrative embodiments, all three of the film layers of the A/B/A film are irradiated. In some embodiments, the A layer comprises polyethylene. In some embodiments, the B layer comprises polyethylene.

In some embodiments, the A layer of the A/B/A film is at least about 10% or about 40% of the thickness of the film. In some embodiments, the A first layer is about 10% to about 40% of the thickness of the film. In some embodiments, the B layer of the A/B/A film is at least about 20% or about 80% of the thickness of the film. In some embodiments, the B layer is about 20% to about 80% of the thickness of the film. In some embodiments, the second A layer of the A/B/A film is at least about 10% or about 40% of the thickness of the film. In some embodiments, the second A layer is about 10% to about 40% of the thickness of the film. In some embodiments, the ratio of the thickness of the layers of the A/B/A film is about 10/80/10, about 20/70/10, about 20/60/20, 30/50/20, about 30/40/30, about 40/30/30, or about 40/20/40.

In some embodiments, a shrink film comprises at least three layers and has an A/B/C arrangement wherein A, B, and C denote different layer compositions. In illustrative embodiments, the A layer is described herein as the at least one layer. In some other illustrative embodiments, the B layer is described herein as the at least one layer. In some embodiments, the A layer is not irradiated. In some embodiments, the B layer is not irradiated. In some embodiments, the C layer is not irradiated. Illustratively, the irradiating process can be performed by exposing both sides of the A/B/C film to radiation so that the A layer or the C layer is selectively irradiated. In some other illustrative embodiments, all three of the film layers of the A/B/C film are irradiated. In some embodiments, the film is irradiated so that the A and B layers are irradiated and the C layer is not irradiated or so that the B and C layers are irradiated and the A layer is not irradiated.

In some embodiments, the A layer of the A/B/C film is at least about 10% or about 40% of the thickness of the film. In some embodiments, the A layer is about 10% to about 40% of the thickness of the film. In some embodiments, the B layer of the A/B/C film is at least about 20% or about 80% of the thickness of the film. In some embodiments, the B layer is about 20% to about 80% of the thickness of the film. In some embodiments, the C layer of the A/B/C film is at least about 10% or about 40% of the thickness of the film. In some embodiments, the C layer is about 10% to about 40% of the thickness of the film. In some embodiments, the ratio of the thickness of the layers of the A/B/C film is about 10/80/10, about 20/70/10, about 20/60/20, 30/50/20, about 30/40/30, about 40/30/30, or about 40/20/40.

The polymers (or combination of polymers) used to make the shrink film in accordance with the present disclosure may include any thermoplastic polymer or elastomer that is capable of crosslinking. Illustrative thermoplastic polymers include polyethylene homopolymers and copolymers, nylons, polyvinyl chlorides, polyvinylidene fluorides, polyesters, such as PET, PETG, and PBT, ethylene vinyl acetates, and polylactic acids. Illustrative elastomers include styrene-butadiene rubbers, silicone rubbers, thermoplastic elastomers, thermoplastic urethanes, polyisoprenes, ethylene propylene rubber, ethylene propylene diene rubber, chlorinated polyethylene, fluoroelastomers, polychloroprenes, polyester elastomer, butadiene rubber, and isoprene rubber. In some embodiments, the crosslinked shrink films described herein may be formed from various commodity resins. Commodity resins may be used in combination with increased line speeds for production of shrink film. In some examples, the shrink film is Optimil® available from Berry Global. In some examples, the shrink film is 3404B available from Berry Global.

In illustrative embodiments, the thermoplastic polymer includes a polyolefin, including but not limited to homopolymers, copolymers, terpolymers, and/or blends thereof. Representative polyolefins that may be used in accordance with the present disclosure include but are not limited to low density polyethylene (LDPE), high density polyethylene (HDPE), linear low density polyethylene (LLDPE), metallocene polyethylene (mPE), very low density polyethylene (VLDPE), ultra-low density polyethylene (ULDPE), polypropylene, ethylene-propylene copolymers, polymers made using a single-site catalyst, ethylene maleic anhydride copolymers (EMAs), ethylene vinyl acetate copolymers (EVAs), polymers made using Ziegler-Natta catalysts, styrene-containing block copolymers, and/or the like, and combinations thereof. Methods for manufacturing polyolefins are described in *The Wiley Encyclopedia of Packaging Technology* (Aaron L. Brody et al. eds., 2nd Ed. 1997), which is incorporated by reference herein in its entirety, except that in the event of any inconsistent disclosure or definition from the present specification, the disclosure or definition herein shall be deemed to prevail. The density of a polyethylene may be achieved by copolymerizing ethylene with a sufficient amount of one or more monomers. In illustrative embodiments, the monomers are selected from 1-butene, 1-hexene, 4-methyl-1-pentene, 1-octene, and combinations thereof. Methods for manufacturing polypropylene are described in *Kirk-Othmer Concise Encyclopedia of Chemical Technology*, pp. 1420-1421 (Jacqueline I. Kroschwitz et al. eds., 4th Ed. 1999), which is incorporated herein by reference, except that in the event of any inconsistent disclosure or definition from the present specification, the disclosure or definition herein shall be deemed to prevail.

In illustrative embodiments, a polyolefin for use in accordance with the present disclosure includes polyethylene. In some embodiments, the polyethylene may be a long chain branching polyethylene, such as a long chain branching LDPE. The polyethylene can be a homopolymer or a copolymer.

When a layer of the crosslinked shrink film comprises LDPE, that layer may comprise about 1 wt % LDPE to about 99 wt % LDPE, about 10 wt % LDPE to about 90 wt % LDPE, about 20 wt % LDPE to about 90 wt % LDPE, about 30 wt % LDPE to about 90 wt % LDPE, about 40 wt % LDPE to about 90 wt % LDPE, about 50 wt % LDPE to about 90 wt % LDPE, about 60 wt % LDPE to about 90 wt % LDPE, about 70 wt % LDPE to about 90 wt % LDPE, about 80 wt % LDPE to about 90 wt % LDPE, about 10 wt % LDPE to about 80 wt % LDPE, about 20 wt % LDPE to about 80 wt % LDPE, about 30 wt % LDPE to about 80 wt % LDPE, about 40 wt % LDPE to about 80 wt % LDPE, about 50 wt % LDPE to about 80 wt % LDPE, about 60 wt % LDPE to about 80 wt % LDPE, about 70 wt % LDPE to about 80 wt % LDPE, about 10 wt % LDPE to about 70 wt % LDPE, about 20 wt % LDPE to about 70 wt % LDPE, about 30 wt % LDPE to about 70 wt % LDPE, about 40 wt % LDPE to about 70 wt % LDPE, about 50 wt % LDPE to about 70 wt % LDPE, about 60 wt % LDPE to about 70 wt % LDPE, about 10 wt % LDPE to about 60 wt % LDPE, about 20 wt % LDPE to about 60 wt % LDPE, about 30 wt % LDPE to about 60 wt % LDPE, about 40 wt % LDPE to about 60 wt % LDPE, about 50 wt % LDPE to about 60 wt % LDPE, about 10 wt % LDPE to about 50 wt % LDPE, about 20 wt % LDPE to about 50 wt % LDPE, about 30 wt % LDPE to about 50 wt % LDPE, about 40 wt % LDPE to about 50 wt % LDPE, about 10 wt % LDPE to about 40 wt % LDPE, about 20 wt % LDPE to about 40 wt % LDPE, about 30 wt % LDPE to about 40 wt % LDPE, about 10 wt % LDPE to about 30 wt % LDPE, about 20 wt % LDPE to about 30 wt % LDPE, or about 10 wt % LDPE to about 20 wt % LDPE. In some embodiments, the layer comprises less than about 50% or less than about 40% LDPE. In some embodiments, the layer comprises at least about 60% or at least about 70% LDPE.

When a layer of the crosslinked shrink film comprises HDPE, that layer may comprise about 1 wt % HDPE to about 99 wt % HDPE, about 10 wt % HDPE to about 90 wt % HDPE, about 20 wt % HDPE to about 90 wt % HDPE, about 30 wt % HDPE to about 90 wt % HDPE, about 40 wt % HDPE to about 90 wt % HDPE, about 50 wt % HDPE to about 90 wt % HDPE, about 60 wt % HDPE to about 90 wt % HDPE, about 70 wt % HDPE to about 90 wt % HDPE, about 80 wt % HDPE to about 90 wt % HDPE, about 10 wt % HDPE to about 80 wt % HDPE, about 20 wt % HDPE to about 80 wt % HDPE, about 30 wt % HDPE to about 80 wt % HDPE, about 40 wt % HDPE to about 80 wt % HDPE, about 50 wt % HDPE to about 80 wt % HDPE, about 60 wt % HDPE to about 80 wt % HDPE, about 70 wt % HDPE to about 80 wt % HDPE, about 10 wt % HDPE to about 70 wt % HDPE, about 20 wt % HDPE to about 70 wt % HDPE, about 30 wt % HDPE to about 70 wt % HDPE, about 40 wt % HDPE to about 70 wt % HDPE, about 50 wt % HDPE to about 70 wt % HDPE, about 60 wt % HDPE to about 70 wt % HDPE, about 10 wt % HDPE to about 60 wt % HDPE, about 20 wt % HDPE to about 60 wt % HDPE, about 30 wt % HDPE to about 60 wt % HDPE, about 40 wt % HDPE to about 60 wt % HDPE, about 50 wt % HDPE to about 60 wt % HDPE, about 10 wt % HDPE to about 50 wt % HDPE, about 20 wt % HDPE to about 50 wt % HDPE, about 30 wt % HDPE to about 50 wt % HDPE, about 40 wt % HDPE to about 50 wt % HDPE, about 10 wt % HDPE to about 40 wt % HDPE, about 20 wt % HDPE to about 40 wt % HDPE, about 30 wt % HDPE to about 40 wt % HDPE, about 10 wt % HDPE to about 30 wt % HDPE, about 20 wt % HDPE to about 30 wt % HDPE, or about 10 wt % HDPE to about 20 wt % HDPE. In some embodiments, the layer comprises less than about 40% or less than about 35% HDPE. In some embodiments, the layer comprises at least about 30% or at least about 35% HDPE.

When a layer of the crosslinked shrink film comprises mPE, that layer may comprise about 1 wt % mPE to about 99 wt % mPE, about 10 wt % mPE to about 90 wt % mPE, about 20 wt % mPE to about 90 wt % mPE, about 30 wt % mPE to about 90 wt % mPE, about 40 wt % mPE to about 90 wt % mPE, about 50 wt % mPE to about 90 wt % mPE, about 60 wt % mPE to about 90 wt % mPE, about 70 wt % mPE to about 90 wt % mPE, about 80 wt % mPE to about 90 wt % mPE, about 10 wt % mPE to about 80 wt % mPE, about 20 wt % mPE to about 80 wt % mPE, about 30 wt % mPE to about 80 wt % mPE, about 40 wt % mPE to about 80 wt % mPE, about 50 wt % mPE to about 80 wt % mPE, about 60 wt % mPE to about 80 wt % mPE, about 70 wt % mPE to about 80 wt % mPE, about 10 wt % mPE to about 70 wt % mPE, about 20 wt % mPE to about 70 wt % mPE, about 30 wt % mPE to about 70 wt % mPE, about 40 wt % mPE to about 70 wt % mPE, about 50 wt % mPE to about 70 wt % mPE, about 60 wt % mPE to about 70 wt % mPE, about 10 wt % mPE to about 60 wt % mPE, about 20 wt % mPE to about 60 wt % mPE, about 30 wt % mPE to about 60 wt % mPE, about 40 wt % mPE to about 60 wt % mPE, about 50 wt % mPE to about 60 wt % mPE, about 10 wt % mPE to about 50 wt % mPE, about 20 wt % mPE to about 50 wt % mPE, about 30 wt % mPE to about 50 wt % mPE, about 40 wt % mPE to about 50 wt % mPE, about 10 wt % mPE to about 40 wt % mPE, about 20 wt % mPE to about 40 wt % mPE, about 30 wt % mPE to about 40 wt % mPE, about 10 wt % mPE to about 30 wt % mPE, about 20 wt % mPE to about 30 wt % mPE, or about 10 wt % mPE to about 20 wt % mPE. In some embodiments, the layer comprises less than about 40% or less than about 35% mPE. In some embodiments, the layer comprises at least about 10% or at least about 20% mPE.

In some embodiments, the crosslinked shrink film includes a layer comprising a blend of polymers. In illustrative embodiments, a layer of the crosslinked shrink film comprises a blend of at least two or at least three polymers. In some embodiments, a layer of the crosslinked shrink film comprises a blend of at least two or at least three polyolefins. In some embodiments, a layer of the crosslinked shrink film comprises a blend of at least two or at least three polyethylenes.

In one example, the crosslinked shrink film includes a layer comprising a combination of low density polyethylene and high density polyethylene, each in amounts described herein. In another example, the crosslinked shrink film includes a layer comprising a combination of low density polyethylene, high density polyethylene, and metallocene polyethylene, each in amounts described herein. In an exemplary embodiment, a layer of the crosslinked shrink film comprises about 73% LDPE and about 27% HDPE. In another exemplary embodiment, a layer of the crosslinked shrink film comprises about 30% LDPE, about 39% HDPE, about 28%, and about 3% antistat.

The amount of each polymer included in the multi-layer shrink films in accordance with the present disclosure is selected to create a desirable balance of several physical properties. Additionally, in some embodiments, the amount of each component in the shrink film is selected such that the shrink film is recyclable. However, it is contemplated that in some embodiments the composition of the film and/or dosage of radiation may produce a shrink film with increased performance that is not recyclable. The shrink films described herein balance increased load, holding containment, and stretch with clarity, puncture resistance, and resistance to tear propagation.

The polymer formulations of the present disclosure may further include a solid filler. The solid filler for use in accordance with the present disclosure is not restricted, and may include all manner of inorganic or organic materials that are non-reactive with thermoplastic polymer and configured for being uniformly blended and dispersed in the thermoplastic polymer. In illustrative embodiments, the solid filler includes an inorganic filler. Representative inorganic fillers for use in accordance with the present disclosure include but are not limited to sodium carbonate, calcium carbonate, magnesium carbonate, barium sulfate, magnesium sulfate, aluminum sulfate, magnesium oxide, calcium oxide, alumina, mica, talc, silica, clay (e.g., non-swellable clay), glass spheres, titanium dioxide, aluminum hydroxide, zeolites, and a combination thereof. In illustrative embodiments, the inorganic filler includes an alkali metal carbonate, an alkaline earth metal carbonate, an alkali metal sulfate, an alkaline earth metal sulfate, or a combination thereof. In one example, the inorganic filler includes calcium carbonate.

In addition to containing one or more thermoplastic polymers and an optional solid filler, the films described herein may optionally contain one or more additional components to improve the film properties or processing of the shrink film. Representative optional components include but are not limited to anti-oxidants (e.g., added to reduce the tendency of the film to discolor over time), processing aids (e.g., added to facilitate extrusion of the precursor film), or antistats. In one example, the amount of one or more anti-oxidants in the precursor film is less than about 1% by weight of the film, and the amount of one or more processing aids is less than about 5% by weight of the film. In another example, the amount of antistat is about 3% by weight of the layer. Additional optional additives include but are not limited to whitening agents (e.g., titanium dioxide), which may be added to increase the opacity of the film. In one example, the amount of one or more whitening agents is less than about 10% by weight of the film. Further optional components include but are not limited to antiblocking agents (e.g., diatomaceous earth) and slip agents (e.g., erucamide), which may be added to allow film rolls to unwind properly and to facilitate secondary processing. In one example, the amount of one or more antiblocking agents and/or one or more slip agents is less than about 5% by weight of the film. Further additional optional additives include but are not limited to scents, deodorizers, pigments including black, white, and other colors, noise reducing agents, and/or the like, and combinations thereof. In one example, the amount of one or more scents, deodorizers, pigments other than white, and/or noise reducing agents is less than about 10% by weight of the film.

The thickness of the crosslinked shrink film in accordance with the present disclosure may vary depending on the intended application for the film. The thickness of each individual layer may be similar or different in addition to having similar or different compositions. The thickness of each layer is therefore independent and may vary within the parameters set by the total thickness of the film.

In some embodiments, a shrink film, or a layer thereof, in accordance with the present disclosure has a gauge ranging from about 0.25 mil to about 8 mil, about 0.25 mil to about 5 mil, about 0.25 mil to about 4 mil, about 0.25 mil to about 3 mil, about 0.5 mil to about 8 mil, about 0.5 mil to about 5 mil, about 0.5 mil to about 4 mil, about 0.5 mil to about 3 mil, about 1 mil to about 8 mil, about 1 mil to about 5 mil, about 1 mil to about 4 mil, about 1 mil to about 3 mil, about 1 mil to about 2.5 mil, about 1 mil to about 2.25 mil, about 1 mil to about 2 mil, about 1 mil to about 1.5 mil, about 1 mil to about 1.25 mil, about 1.25 mil to about 2.25 mil, about 1.25 mil to about 2 mil, about 1.25 mil to about 1.5 mil, about 1.5 mil to about 2.25 mil, about 1.5 mil to about 2 mil, about 2 mil to about 2.25 mil, about 1.25 mil, about 1.5 mil, about 2 mil, or about 2.25 mil. In a second set of ranges, the shrink film, or a layer thereof, in accordance with the present disclosure has gauge ranging from about 0.8 mil to about 12 mil. In these gauge ranges, a crosslinked shrink film in accordance with the present disclosure performs better than a higher gauge film that has not been crosslinked (e.g., a conventional film).

The overall thickness of a shrink film in accordance with the present disclosure may be varied depending on the particular end use for which the shrink film is manufactured. In one example, shrink films in accordance with the present disclosure may have a thickness in the range of typical thicknesses for shrink films. However, the thickness may be varied to be any suitable thickness in accordance with the present disclosure.

The crosslinked shrink films described herein exhibit surprisingly improved performance characteristics of shrink film, including improved tensile strength, tear resistance, puncture resistance, and dart impact strength, when compared to other shrink films.

In illustrative embodiments, the tensile strength of the crosslinked shrink films described herein is surprisingly improved compared to other shrink films. In the machine direction, the tensile strength of the films described herein may be from about 3,500 PSI to about 5,500 PSI, about 3,500 PSI to about 5,000 PSI, or about 4,000 PSI to about 5000 PSI. In the transverse direction, the tensile strength of the films described herein may be from 2,000 PSI to about 4,500 PSI, about 2,500 PSI to about 4,500 PSI, about 3,000 PSI to about 4,500 PSI, about 3,000 PSI to about 4,000 PSI.

In illustrative embodiments, the Elmendorf tear strength of the crosslinked shrink films described herein is surprisingly improved compared to conventional shrink films. In the machine direction, the Elmendorf tear strength of the films described herein may be from about 50 gf to about 550 gf, about 50 gf to about 350 gf, about 50 gf to about 250 gf, about 100 gf to about 550 gf, about 100 gf to about 350 gf, about 100 gf to about 250 gf, about 200 gf to about 550 gf, about 200 gf to about 350 gf, or about 200 gf to about 250 gf. In the transverse direction, the Elmendorf tear strength of the films described herein may be from about 350 gf to about 2,000 gf, about 350 gf to about 1,500 gf, about 350 gf to about 1,150 gf, about 500 gf to about 2,000 gf, about 500 gf to about 1500 gf, or about 500 gf to about 1,150 gf.

In illustrative embodiments, the dart impact strength of the crosslinked shrink films described herein is surprisingly improved compared to conventional shrink films. In the machine direction, the dart impact strength of the films described herein may be from about 50 gf to about 300 gf, about 50 gf to about 200 gf, about 50 gf to about 150 gf, about 50 gf to about 130 gf, about 75 gf to about 300 gf, about 75 gf to about 200 gf, about 75 gf to about 150 gf, or about 75 gf to about 130 gf. In the transverse direction, the dart impact strength of the films described herein may be from about 1,300 gf to about 2,800 gf, about 1,500 gf to about 2,800 gf, about 1,700 gf to about 2,800 gf, about 1,300 gf to about 2,250 gf, about 1,500 gf to about 2,250 gf, or about 1,700 gf to about 2,250 gf.

In some embodiments, an irradiated film demonstrates a particular percentage improvement in dart impact strength over a non-irradiated film made from the same composition. In some embodiments, the dart impact strength of the irradiated film relative to the non-irradiated film is at least about 105%, at least about 115%, at least about 150%, or at least about 200%. In some embodiments, the percentage improvement in dart strength from irradiating the film is about 105% to about 260%, about 105% to about 240%, or about 120% to about 240%.

In some embodiments, an irradiated film comprising polyethylene has a particular dart impact strength per thickness of the film. In some embodiments, a layer of the irradiated film comprises a blend of HDPE and LDPE. In some embodiments, the dart impact strength per mil is at least about 40 gf/mil or at least about 45 gf/mil. In some embodiments, the dart impact strength per mil of film is in a range of about 40 gf/mil to about 65 gf/mil, about 40 gf/mil to about 55 gf/mil, or about 45 gf/mil to about 55 gf/mil.

In some embodiments, an irradiated film including a layer comprising a blend of LDPE, HDPE, and mPE has a particular dart impact strength per thickness of the film. In some embodiments, the dart impact strength per mil is at least about 65 gf/mil or at least about 70 gf/mil. In some embodiments, the dart impact strength per mil of film is in a range of about 65 gf/mil to about 130 gf/mil, about 65 gf/mil to about 110 gf/mil, or about 65 gf/mil to about 100 gf/mil.

In some embodiments, an irradiated film demonstrates a particular percentage improvement in puncture resistance over a non-irradiated film made from the same composition. In some embodiments, the dart impact strength of the irradiated film relative to the non-irradiated film is at least about 105%, at least about 115%, at least about 150%, or at least about 200%. In some embodiments, the percentage improvement in dart strength from irradiating the film is about 105% to about 175%, about 105% to about 150%, about 105% to about 130%, or about 110% to about 130%.

In some embodiments, an irradiated film comprising polyethylene has a particular puncture resistance per thickness of the film. In some embodiments, a layer of the film comprises a blend of HDPE and LDPE. In some embodiments, the puncture resistance per mil is at least about 1,050 gf/mil or at least about 1,100 gf/mil. In some embodiments, the puncture resistance per mil of film is in a range of about 1,050 gf/mil to about 1,250 gf/mil, about 1,050 gf/mil to about 1,100 gf/mil, or about 1,050 gf/mil to about 1,000 gf/mil.

In some embodiments, an irradiated film including a layer comprising a blend of LDPE, HDPE, and mPE has a particular puncture resistance per thickness of the film. In some embodiments, the puncture resistance per mil is at least about 1,120 gf/mil or at least about 1,200 gf/mil. In some embodiments, the dart impact strength per mil of film is in a range of about 1,120 gf/mil to about 1,400 gf/mil, about 1,120 gf/mil to about 1,350 gf/mil, or about 1,120 gf/mil to about 1,300 gf/mil.

The following numbered clauses include embodiments that are contemplated and non-limiting:

Clause 1. A process for making a shrink film, the process comprising the steps of extruding an extrudable material through a die to form a molten tubular film.

Clause 2. The process of clause 1, any other suitable clause, or any combination of suitable clauses, further comprising the step of injecting the molten tubular film with air to form a film bubble.

Clause 3. The process of clause 2, any other suitable clause, or any combination of suitable clauses, further comprising the step of drawing the film bubble away from the die to form a shrink film.

Clause 4. The process of clause 3, any other suitable clause, or any combination of suitable clauses, wherein the drawing step includes a step of crosslinking the film bubble.

Clause 5. The process of clause 4, any other suitable clause, or any combination of suitable clauses, wherein crosslinking comprises electron beam irradiation with a dose of about 1.25 Mrad to about 10 Mrad.

Clause 6. The process of clause 5, any other suitable clause, or any combination of suitable clauses, further comprising collapsing the film bubble upon itself to form a blocked shrink film.

Clause 7. The process of clause 6, any other suitable clause, or any combination of suitable clauses, wherein the step of crosslinking the film bubble occurs after the step of collapsing.

Clause 8. The process of clause 7, any other suitable clause, or any combination of suitable clauses, wherein crosslinking comprises electron beam irradiation at a potential of about 100 KeV to about 250 KeV.

Clause 9. The process of clause 8, any other suitable clause, or any combination of suitable clauses, wherein crosslinking comprises electron beam irradiation at a potential of about 175 KeV.

Clause 10. The process of clause 6, any other suitable clause, or any combination of suitable clauses, wherein crosslinking comprises electron beam irradiation a potential selected based on the thickness of the film.

Clause 11. The process of clause 4, any other suitable clause, or any combination of suitable clauses, further comprising slitting the film bubble.

Clause 12. The process of clause 11, any other suitable clause, or any combination of suitable clauses, wherein crosslinking comprises electron beam irradiation with a dose of about 1.25 Mrad to about 10 Mrad.

Clause 13. The process of clause 4, any other suitable clause, or any combination of suitable clauses, wherein the extrudable material comprises a crosslinkable thermoplastic, a crosslinkable elastomer, or a mixture thereof.

Clause 14. The process of clause 13, any other suitable clause, or any combination of suitable clauses, wherein the crosslinkable thermoplastic is selected from the group consisting of polyethylene homopolymers and copolymers, nylons, polyvinyl chlorides, polyvinylidene fluorides, polyesters, ethylene vinyl acetates, polylactic acids, and mixtures thereof.

Clause 15. The process of clause 13, any other suitable clause, or any combination of suitable clauses, wherein the crosslinkable elastomer is selected from the group consisting of styrene-butadiene rubbers, silicone rubbers, thermoplastic elastomers, thermoplastic urethanes, polyisoprenes, ethylene propylene rubber, ethylene propylene diene rubbers, chlorinated polyethylenes, fluoroelastomers, polychloroprenes, polyester elastomers, butadiene rubbers, isoprene rubbers, and mixtures thereof.

Clause 16. The process of clause 4, any other suitable clause, or any combination of suitable clauses, wherein the extrudable material comprises a polyethylene.

Clause 17. The process of clause 16, any other suitable clause, or any combination of suitable clauses, wherein the polyethylene is selected from the group consisting of LDPE, HDPE, mPE, and mixtures thereof.

Clause 18. The process of clause 16, any other suitable clause, or any combination of suitable clauses, wherein the polyethylene comprises LDPE.

Clause 19. The process of clause 16, any other suitable clause, or any combination of suitable clauses, wherein the polyethylene comprises HDPE.

Clause 20. The process of clause 16, any other suitable clause, or any combination of suitable clauses, wherein the polyethylene comprises mPE.

Clause 21. The process of clause 4, any other suitable clause, or any combination of suitable clauses, wherein the extrudable material comprises a blend of polyethylene and polypropylene.

Clause 22. The process of clause 21, any other suitable clause, or any combination of suitable clauses, wherein the polyethylene comprises homopolymer polyethylene.

Clause 23. The process of clause 21, any other suitable clause, or any combination of suitable clauses, wherein the polyethylene comprises copolymer polyethylene.

Clause 24. The process of clause 21, any other suitable clause, or any combination of suitable clauses, wherein the polyethylene comprises a mixture of homopolymer polyethylene and copolymer polyethylene.

Clause 25. The process of clause 4, any other suitable clause, or any combination of suitable clauses, wherein crosslinking comprises electron beam irradiation at a potential of about 100 KeV to about 250 KeV.

Clause 26. The process of clause 25, any other suitable clause, or any combination of suitable clauses, wherein crosslinking comprises electron beam irradiation at a potential of about 175 KeV.

Clause 27. The process of clause 25, any other suitable clause, or any combination of suitable clauses, wherein crosslinking comprises electron beam irradiation at a radiation dosage selected based on the thickness of the film.

Clause 28. The process of clause 25, any other suitable clause, or any combination of suitable clauses, wherein the film is about 1 mil to about 3 mils thick.

Clause 29. The process of clause 4, any other suitable clause, or any combination of suitable clauses, wherein crosslinking comprises electron beam irradiation at a radiation dosage selected based on the thickness of the film.

Clause 30. The process of clause 4, any other suitable clause, or any combination of suitable clauses, wherein the shrink film consists of one layer.

Clause 31. The process of clause 4, any other suitable clause, or any combination of suitable clauses, wherein the shrink film comprises multiple layers.

Clause 32. The process of clause 4, any other suitable clause, or any combination of suitable clauses, wherein the shrink film is recyclable.

Clause 33. The process of clause 4, any other suitable clause, or any combination of suitable clauses, wherein the extrudable material comprises at least one additive selected from the group consisting of scents, deodorizers, pigments, noise reducing agents, and combinations thereof.

Clause 34. The process of clause 4, any other suitable clause, or any combination of suitable clauses, wherein the shrink film has a thickness of about 1 mil to about 3 mil.

Clause 35. A shrink film comprising at least one layer comprising a crosslinkable thermoplastic, a crosslinkable elastomer, or a mixture thereof.

Clause 36. The shrink film of clause 35, any other suitable clause, or any combination of clauses, wherein the layer has been irradiated at a dose of about 1.25 Mrad to about 10 Mrad.

Clause 37. The shrink film of clause 36, any other clause, or any combination of clauses, wherein the layer has a thickness of about 1 mil to about 3 mil.

Clause 35. The shrink film of clause 37, any other suitable clause, or any combination of suitable clauses, wherein the crosslinkable thermoplastic is selected from the group consisting of polyethylene homopolymers and copolymers, nylons, polyvinyl chlorides, polyvinylidene fluorides, polyesters, ethylene vinyl acetates, polylactic acids, and mixtures thereof.

Clause 39. The shrink film of clause 37, any other suitable clause, or any combination of suitable clauses, wherein the crosslinkable elastomer is selected from the group consisting of styrene-butadiene rubbers, silicone rubbers, thermoplastic elastomers, thermoplastic urethanes, polyisoprenes, ethylene propylene rubber, ethylene propylene diene rubbers, chlorinated polyethylenes, fluoroelastomers, polychloroprenes, polyester elastomers, butadiene rubbers, isoprene rubbers, and mixtures thereof.

Clause 40. The shrink film of clause 37, any other suitable clause, or any combination of suitable clauses, comprising a polyethylene.

Clause 41. The shrink film of clause 40, any other suitable clause, or any combination of suitable clauses, wherein the polyethylene is selected from the group consisting of LDPE, HDPE, mPE, and mixtures thereof.

Clause 42. The shrink film of clause 40, any other suitable clause, or any combination of suitable clauses, wherein the polyethylene comprises LDPE.

Clause 43. The shrink film of clause 40, any other suitable clause, or any combination of suitable clauses, wherein the polyethylene comprises HDPE.

Clause 44. The shrink film of clause 40, any other suitable clause, or any combination of suitable clauses, wherein the polyethylene comprises mPE.

Clause 45. The shrink film of clause 37, any other suitable clause, or any combination of suitable clauses, wherein the at least one layer comprises a blend of polyethylene and polypropylene.

Clause 46. The shrink film of clause 45, any other suitable clause, or any combination of suitable clauses, wherein the at least one layer has been irradiated at a potential selected based on the thickness of the film.

Clause 47. The shrink film of clause 37, any other suitable clause, or any combination of suitable clauses, wherein the at least one layer comprises homopolymer polyethylene.

Clause 48. The shrink film of clause 37, any other suitable clause, or any combination of suitable clauses, wherein the at least one layer comprises copolymer polyethylene.

Clause 49. The shrink film of clause 37, any other suitable clause, or any combination of suitable clauses, wherein the at least one layer comprises a mixture of homopolymer polyethylene and copolymer polyethylene.

Clause 50. The shrink film of clause 37, any other suitable clause, or any combination of suitable clauses, wherein the at least one layer has been irradiated at a potential of about 100 KeV to about 250 KeV.

Clause 51. The shrink film of clause 37, any other suitable clause, or any combination of suitable clauses, wherein the at least one layer has been irradiated at a potential of about 175 KeV.

Clause 52. The shrink film of clause 37, any other suitable clause, or any combination of suitable clauses, wherein the shrink film consists of one layer.

Clause 53. The shrink film of clause 37, any other suitable clause, or any combination of suitable clauses, wherein the shrink film comprises multiple layers.

Clause 54. The shrink film of clause 37, any other suitable clause, or any combination of suitable clauses, wherein the at least one layer is recyclable.

Clause 55. The shrink film of clause 37, any other suitable clause, or any combination of suitable clauses, wherein the shrink film is recyclable.

Clause 56. The shrink film of clause 37, any other suitable clause, or any combination of suitable clauses, wherein the at least one layer comprises at least one additive selected from the group consisting of scents, deodorizers, pigments, noise reducing agents, and combinations thereof.

Clause 57. A shrink film comprising at least one layer comprising polyethylene.

Clause 58. The shrink film of clause 57, any other suitable clause, or any combination of suitable clauses, wherein the impact strength of the shrink film is at least 40 gf/mil.

Clause 59. The shrink film of clause 58, any other suitable clause, or any combination of suitable clauses, wherein the puncture resistance of the shrink film is at least 1,050 gf/mil.

Clause 60. The shrink film of clause 59, any other suitable clause, or any combination of suitable clauses, wherein the at least one layer comprises a low density polyethylene (LDPE) and a high density polyethylene (HDPE).

Clause 61. The shrink film of clause 60, any other suitable clause, or any combination of suitable clauses, wherein the at least one layer comprises at least about 60% LDPE.

Clause 62. The shrink film of clause 61, any other suitable clause, or any combination of suitable clauses, wherein the at least one layer comprises about 60% to about 90% LDPE.

Clause 63. The shrink film of clause 61, any other suitable clause, or any combination of suitable clauses, wherein the at least one layer comprises less than about 40% HDPE.

Clause 64. The shrink film of clause 63, any other suitable clause, or any combination of suitable clauses, wherein the at least one layer comprises about 10% to about 30% HDPE.

Clause 65. The shrink film of clause 63, any other suitable clause, or any combination of suitable clauses, wherein the impact strength of the film is about 65 gf/mil to about 130 gf/mil.

Clause 66. The shrink film of clause 65, any other suitable clause, or any combination of suitable clauses, wherein the puncture resistance of the film is about 1,050 gf/mil to about 1,250 gf/mil.

Clause 67. The shrink film of clause 65, any other suitable clause, or any combination of suitable clauses, wherein the at least one layer does not comprise metallocene polyethylene (mPE).

Clause 68. The shrink film of clause 59, any other suitable clause, or any combination of suitable clauses, wherein the impact strength of the film is at least about 65 gf/mil.

Clause 69. The shrink film of clause 68, any other suitable clause, or any combination of suitable clauses, wherein the puncture resistance of the film is at least about 1,120 gf/mil.

Clause 70. The shrink film of clause 68, any other suitable clause, or any combination of suitable clauses, wherein the at least one layer comprises metallocene polyethylene (mPE).

Clause 71. The shrink film of clause 70, any other suitable clause, or any combination of suitable clauses, wherein the at least one layer comprises at least about 10% mPE.

Clause 72. The shrink film of clause 71, any other suitable clause, or any combination of suitable clauses, wherein the at least one layer comprises about 10% to about 70% mPE.

Clause 73. The shrink film of clause 71, any other suitable clause, or any combination of suitable clauses, wherein the at least one layer comprises less than about 50% LDPE.

Clause 74. The shrink film of clause 73, any other suitable clause, or any combination of suitable clauses, wherein the at least one layer comprises about 10% to 50% LDPE.

Clause 75. The shrink film of clause 73, any other suitable clause, or any combination of suitable clauses, wherein the at least one layer comprises at least about 30% HDPE.

Clause 76. The shrink film of clause 75, any other suitable clause, or any combination of suitable clauses, wherein the at least one layer comprises about 30% to 60% HDPE.

Clause 77. The shrink film of clause 70, any other suitable clause, or any combination of suitable clauses, wherein the impact strength of the film is about 65 gf/mil to about 130 gf/mil.

Clause 78. The shrink film of clause 77, any other suitable clause, or any combination of suitable clauses, wherein the puncture resistance of the film is about 1,120 gf/mil to about 1,400 gf/mil.

The following examples and representative procedures illustrate features in accordance with the present disclosure, and are provided solely by way of illustration. They are not intended to limit the scope of the appended claims or their equivalents.

EXAMPLES

Shrink films were irradiated with electron beam processing according to the conditions described in Tables 1 and 2. Tensile strength, Elmendorf tear resistance, dart impact strength, and puncture resistance were tested. Machine direction tear resistance, dart impact, and puncture resistance of the films showed significant improvement without significant effects on film stiffness. For example, a 1.5 mil first film type had similar or better machine direction tear resistance, dart impact, and puncture resistance than non-e-beam irradiated 2.0 mil first film type (Table 1). Similar performance improvements were observed with thinner gauge second film upon e-beam irradiation (Table 2).

Table 1 describes the properties of an single layer shrink film. A layer of the shrink film comprises about 73% LDPE and about 27% HDPE.

TABLE 1

Tensile strength, Elmendorf tear resistance, dart impact strength, and puncture resistance for crosslinked first film type shrink film.

| Description | Dosage (Mrad) | Tensile Strength (PSI) | | Elmendorf Tear (gf) | | Dart Impact (gf) | Puncture (gf) |
|---|---|---|---|---|---|---|---|
| | | MD | TD | MD | TD | | |
| first film type, 1.5 mil Film, 175 KeV | 0 | 4495 | 2480 | 101 | 673 | 56 | 1523 |
| | 2.5 | 4544 | 2961 | 322 | 480 | 62 | 1484 |
| | 5 | 4570 | 2976 | 396 | 516 | 67 | 1617 |
| | 10 | 4106 | 2923 | 200 | 420 | 78 | 1782 |
| | 15 | 4414 | 2931 | 104 | 366 | 77 | 1715 |
| first film type, 1.75 mil Film, 175 KeV | 0 | 4280 | 2637 | 130 | 686 | 69 | 1700 |
| | 2.5 | 4404 | 2880 | 437 | 553 | 60 | 1728 |
| | 5 | 4264 | 2929 | 504 | 524 | 72 | 1897 |
| | 10 | 3937 | 3204 | 231 | 492 | 81 | 1758 |
| | 15 | 4251 | 3099 | 81 | 410 | 87 | 1938 |
| first film type, 2.0 mil Film, 175 KeV | 0 | 3960 | 2676 | 127 | 695 | 67 | 1775 |
| | 2.5 | 3941 | 2771 | 337 | 472 | 87 | 1677 |
| | 5 | 4048 | 3117 | 352 | 534 | 96 | 1696 |
| | 10 | 3655 | 3089 | 259 | 434 | 88 | 1814 |
| | 15 | 3838 | 3269 | 114 | 474 | 104 | 1905 |
| first film type, 2.25 mil Film, 175 KeV | 0 | 4097 | 2787 | 178 | 639 | 82 | 1976 |
| | 2.5 | 4146 | 2900 | 309 | 503 | 92 | 2035 |
| | 5 | 4037 | 3111 | 287 | 460 | 99 | 2242 |
| | 10 | 3932 | 3427 | 386 | 460 | 113 | 2207 |
| | 15 | 3937 | 3232 | 166 | 353 | 135 | 1859 |

Table 2 describes the properties of a single layer shrink film. A layer of the shrink film comprises about 30% LDPE, about 39% HDPE, about 28% mPE, and about 3% antistat.

TABLE 2

Tensile strength, Elmendorf tear resistance, dart impact strength, and puncture resistance for crosslinked second shrink film type.

| Description | Dosage (Mrad) | Tensile Strength (PSI) | | Elmendorf Tear (gf) | | Dart Impact (gf) | Puncture (gf) |
|---|---|---|---|---|---|---|---|
| | | MD | TD | MD | TD | | |
| second film type, 1.25 mil Film, 175 KeV | 0 | 5258 | 4135 | 39.8 | 802 | 51 | 1353 |
| | 2.5 | 5080 | 3910 | 119 | 901 | 69 | 1627 |
| | 5 | 4809 | 3517 | 128 | 988 | 67 | 1711 |

TABLE 2-continued

Tensile strength, Elmendorf tear resistance, dart impact strength, and puncture resistance for crosslinked second shrink film type.

| Description | Dosage (Mrad) | Tensile Strength (PSI) | | Elmendorf Tear (gf) | | Dart Impact (gf) | Puncture (gf) |
|---|---|---|---|---|---|---|---|
| | | MD | TD | MD | TD | | |
| | 10 | 4458 | 3952 | 74 | 662 | 108 | 1654 |
| | 15 | 3724 | 3865 | 37 | 487 | 124 | 1629 |
| second film type, 1.50 mil Film, 175 KeV | 0 | 5356 | 4171 | 82 | 945 | 97 | 1663 |
| | 2.5 | 4773 | 4217 | 110 | 905 | 88 | 1971 |
| | 5 | 4671 | 4126 | 155 | 945 | 106 | 1996 |
| | 10 | 3739 | 3877 | 102 | 781 | 141 | 2068 |
| | 15 | 3728 | 4194 | 47 | 564 | 144 | 1969 |
| second film type, 2.0 mil Film, 175 KeV | 0 | 5359 | 3793 | 87 | 1587 | 119 | 2197 |
| | 2.5 | 4938 | 3818 | 121 | 1679 | 112 | 2259 |
| | 5 | 4919 | 3332 | 128 | 1469 | 114 | 2436 |
| | 10 | 4397 | 3604 | 130 | 1404 | 162 | 2378 |
| | 15 | 4325 | 3589 | 104 | 945 | 282 | 2514 |
| second film type, 2.25 mil Film, 175 KeV | 0 | 4978 | 3757 | 109 | 1623 | 123 | 2252 |
| | 2.5 | 4790 | 3746 | 109 | 1650 | 124 | 2715 |
| | 5 | 4710 | 4022 | 170 | 1624 | 134 | 2541 |
| | 10 | 4529 | 3939 | 174 | 1444 | 180 | 2618 |
| | 15 | 4391 | 3859 | 108 | 1192 | 248 | 2579 |

The invention claimed is:

1. A process for making a shrink film, the process comprising the steps of extruding an extrudable material through a die to form a molten tubular film,
   injecting the molten tubular film with air to form a film bubble,
   drawing the film bubble away from the die, wherein the drawing step includes a step of crosslinking the film bubble, and
   irradiating the film bubble to form a shrink film, wherein the shrink film is coextruded and has at least two layers with irradiation of the film bubble causing substantially uniform crosslinking in each of the at least two layers,
   wherein the extrudable material comprises about 40 wt. % to about 70 wt. % LDPE, about 30 wt. % to about 40 wt. % HDPE, and about 10 wt. % to about 40 wt. % metallocene polyethylene (mPE).

2. The process of claim 1, wherein the crosslinking step comprises an electron beam irradiation with a dose of about 1.25 Mrad to about 10 Mrad.

3. The process of claim 2, wherein the electron beam irradiation is at a potential of about 100 KeV to about 250 KeV.

4. The process of claim 2, wherein the film is about 1 mil to about 3 mils thick.

5. A process for making a shrink film, the process comprising the steps of extruding an extrudable material through a die to form a molten tubular film,
   injecting the molten tubular film with air to form a film bubble, and
   drawing the film bubble away from the die to form a shrink film,
   wherein the drawing step includes a step of crosslinking the film bubble such that each layer of a plurality of co-extruded layers of the shrink film is substantially uniformly crosslinked to another layer of the plurality of co-extruded layers,
   wherein the extrudable material comprises about 30 wt. % LDPE, about 39 wt. % HDPE, and about 28 wt. % metallocene polyethylene (mPE).

6. The process of claim 5, wherein the crosslinking step comprises an electron beam irradiation with a dose of about 1.25 Mrad to about 10 Mrad.

7. The process of claim 6, wherein the electron beam irradiation is at a potential of about 100 KeV to about 250 KeV.

8. The process of claim 5, wherein the film is about 1 mil to about 3 mils thick.

9. The process of claim 1, wherein the shrink film is recyclable.

10. The process of claim 1, wherein the shrink film has a dart impact strength in a range of about 65 gf/mil to about 130 gf/mil.

* * * * *